Figure 1:
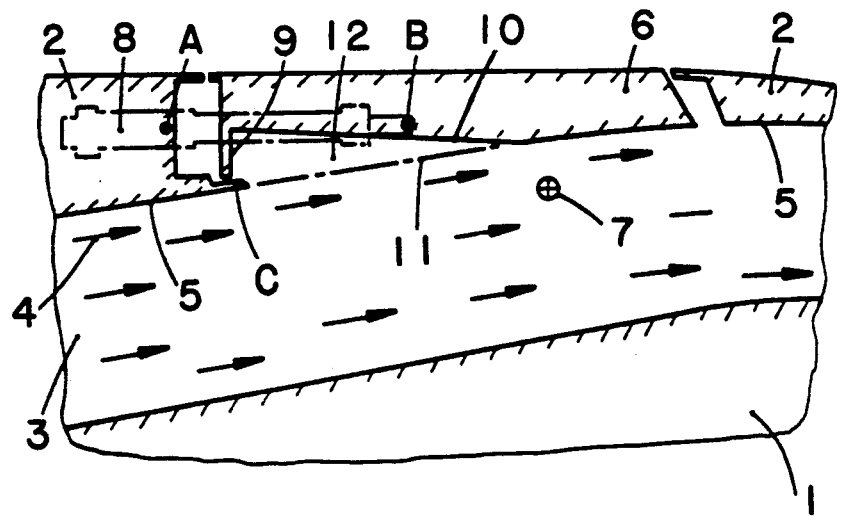

United States Patent [19]

Schegerin et al.

[11] Patent Number: 5,003,770
[45] Date of Patent: Apr. 2, 1991

[54] THRUST REVERSER FOR A JET ENGINE OF THE TYPE WITH DOORS EQUIPPED WITH AUXILIARY FLAPS

[75] Inventors: Robert Schegerin, Jouy en Josas; Bernard Laboure, Velizy; Robert Standish, Gazeran, all of France

[73] Assignee: Societe de Construction des Avions Hurel-Dubois, Meudon la Foret, France

[21] Appl. No.: 397,126

[22] Filed: Aug. 22, 1989

[30] Foreign Application Priority Data

Aug. 29, 1988 [FR] France .................. 88 11325

[51] Int. Cl.⁵ .................................... F02K 1/70
[52] U.S. Cl. .................... 60/226.2; 60/230; 239/265.29
[58] Field of Search ......... 60/226.2, 230, 229; 239/265.31, 265.29, 265.27; 244/110 B, 12.5

[56] References Cited

U.S. PATENT DOCUMENTS

| | | | |
|---|---|---|---|
| 3,605,411 | 9/1971 | Maison et al. | 60/226.2 |
| 4,485,970 | 12/1984 | Fournier et al. | 60/226.2 |
| 4,894,985 | 1/1990 | Dubois et al. | 239/265.29 |
| 4,914,905 | 4/1990 | Dubois et al. | 60/230 |
| 4,916,895 | 4/1990 | Dubois | 60/226.2 |
| 4,922,712 | 5/1990 | Matta et al. | 60/226.2 |

Primary Examiner—Louis J. Casaregola
Assistant Examiner—John A. Savio, III
Attorney, Agent, or Firm—W. Thad Adams, III

[57] ABSTRACT

Thrust reverser for a jet engine of the type with doors equipped with auxiliary flaps. The invention relates to thrust reversers with doors 13 having a front deflector 15. The door is equipped, on its inner face, with one or two auxiliary flaps 16 articulated about axles 17 and controlled by a lever 21 articulated on the door at 22 and stressed into a retracted flap position by means of a spring 24. At the end of closure of the door, the end 31 of the lever interacts with a stop 33 which ensures that the lever tilts and that the flap 16 moves away from the door 13.

10 Claims, 5 Drawing Sheets

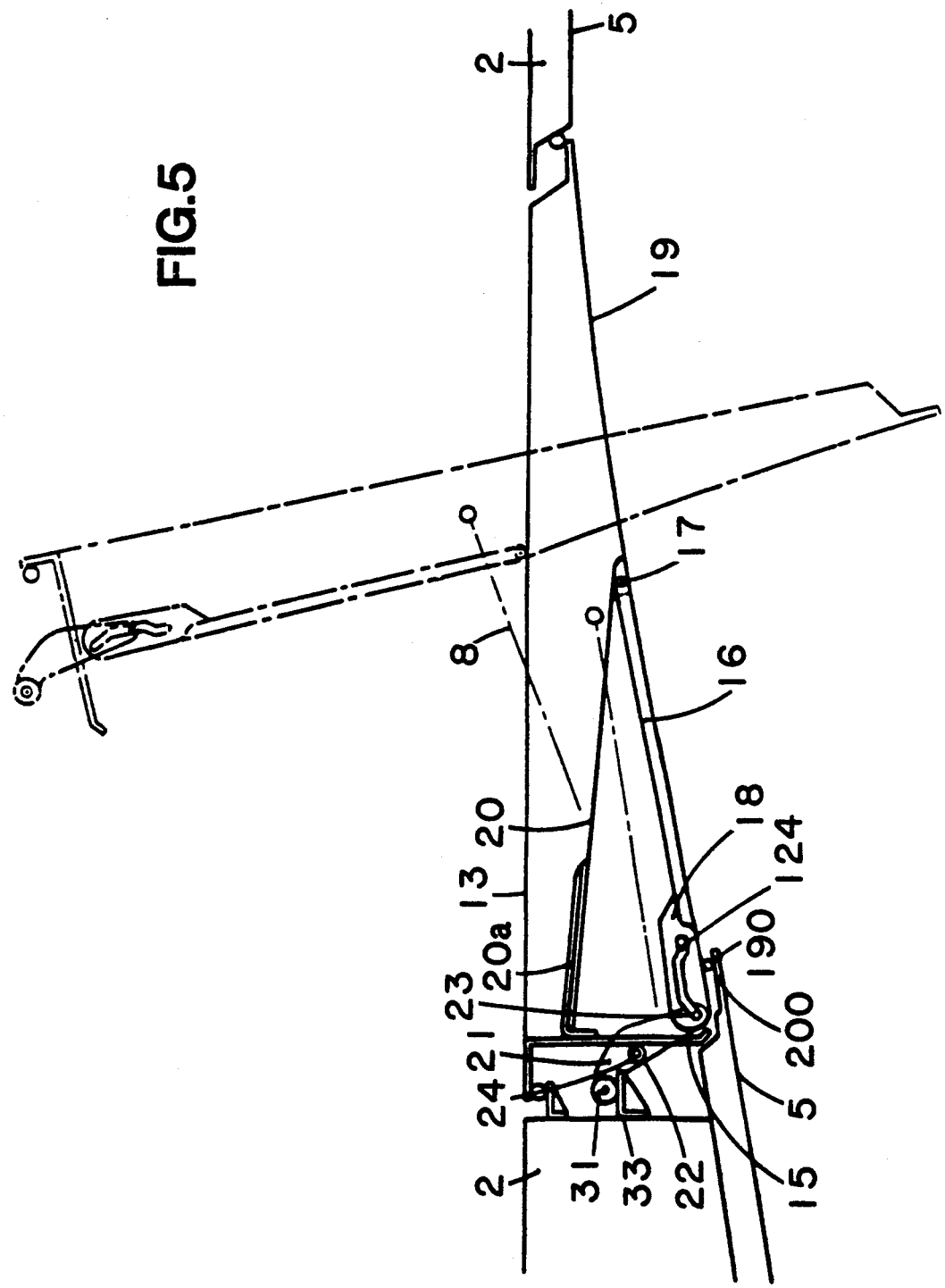

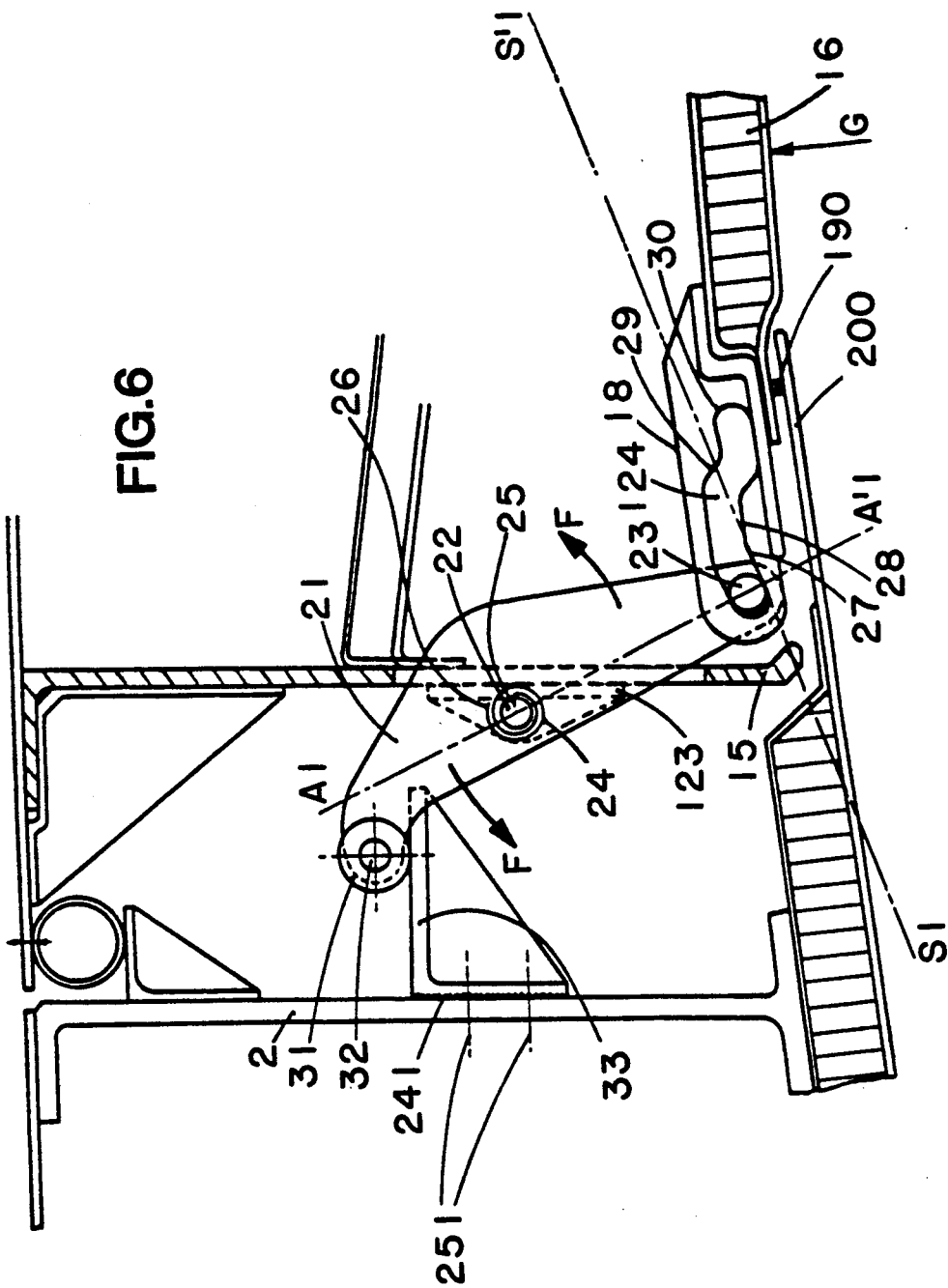

THRUST REVERSER FOR A JET ENGINE OF THE TYPE WITH DOORS EQUIPPED WITH AUXILIARY FLAPS

The present invention relates to a door-type thrust reverser of a jet engine, in which the reverser is intended for deflecting all or some of the propulsion jet when a reverse-mode control is desired.

This type of reverser is well-known, and it is known that the tilting doors, in the closed position, are incorporated in an external cowling delimiting the flow channel of the jet in the direct operating mode, whilst in the reversal position, under the effect of jacks, they tilt transversely relative to the channel in order to deflect all or some of the jet. To make it easier to deflect the jet, these doors have a fixed front deflector which projects relative to the inner wall of the door. Because of the configuration of engines equipped with these reversers, shown in FIG. 1 of the accompanying drawings for the sake of illustration, in the closed-door position or in the cruising position the upstream part of the inner walls of the doors is offset relative to the outer wall of the channel, thus generating a vacuum zone which can disrupt the flow of the jet stream, at the same time causing an increase in fuel consumption.

The present invention is concerned with the solution for overcoming this disadvantage, according to which each door is equipped with at least one auxiliary flap which is mounted on the radially inner side of the door and which, in the closed-door position, assumes its place in alignment with the outer wall of the channel, thereby following the theoretical surface of aerodynamic delimitation of the jet stream, whilst, in the open-door position, the said flap is retracted against the setback upstream part of the door, thus exposing the front deflector.

Solutions of this type have already been proposed, but they are complex in mechanical terms and bring about an appreciable increase in weight of the structure as a whole and therefore make it impossible to profit from the saving of fuel consumption obtained as a result of the presence of the flap.

The invention is defined by the adoption of a very simple, light and absolutely effective mechanical structure. For this purpose, the auxiliary flap is articulated, at its downstream end, about a stationary axle fixed to the inner wall of the door and it is stressed elastically, for example by means of a spring, into its position retracted against the door. A lever which is articulated on the door and one end of which interacts with the flap brings the latter automatically into its position aligned with the outer wall of the annular channel, in the closed-door position, as a result of the interaction of the other end of the lever with a stop carried by the stationary part of the engine.

According to the invention, the upstream end of the flap has a guide slot, in which is engaged movably an axle located at the end of the lever articulated on the door, the said slot advantageously having a substantially arcuate configuration, the convexity of which is directed towards the door.

Preferably, the spring for the elastic return of the flap is a helical spring acting between the lever and a stationary part of the door.

To make it possible to adjust the position of the flap in the closed-door position, the stop on which the lever bears is vertically adjustable.

Finally, it will be seen that each door can be equipped with a single flap occupying the entire width of the door or with two separate flaps.

Figure 7:
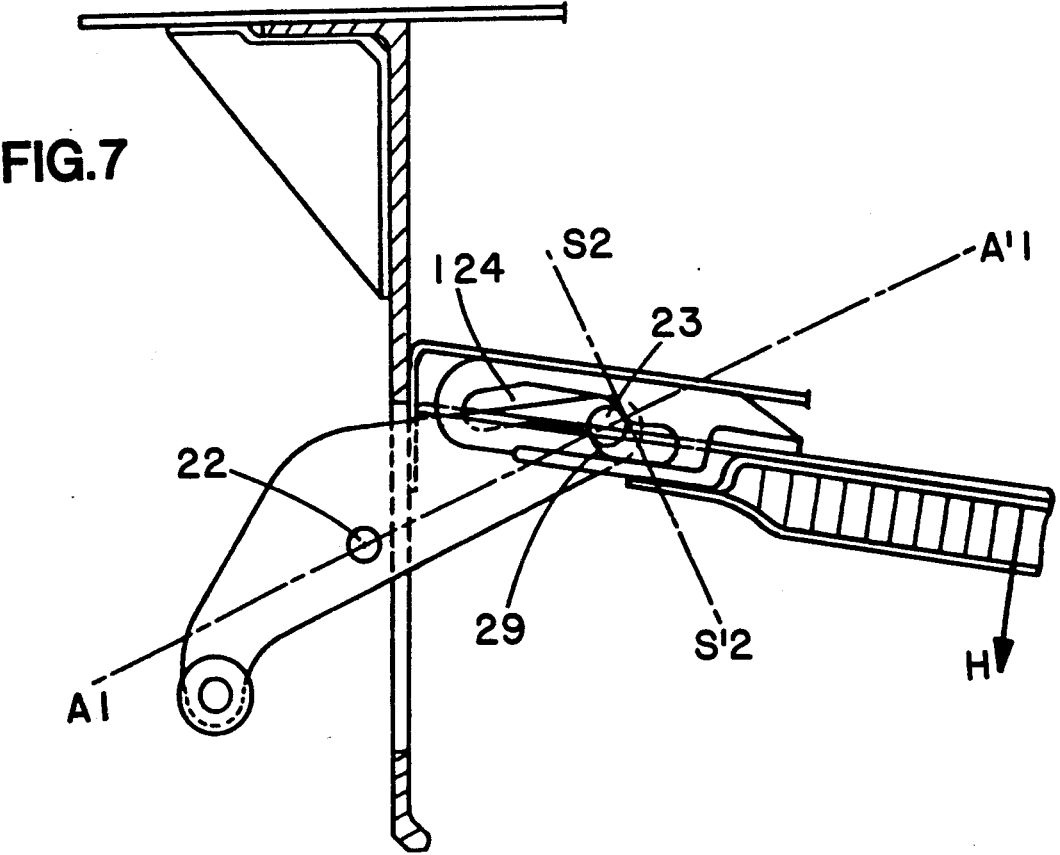
Figure 2:
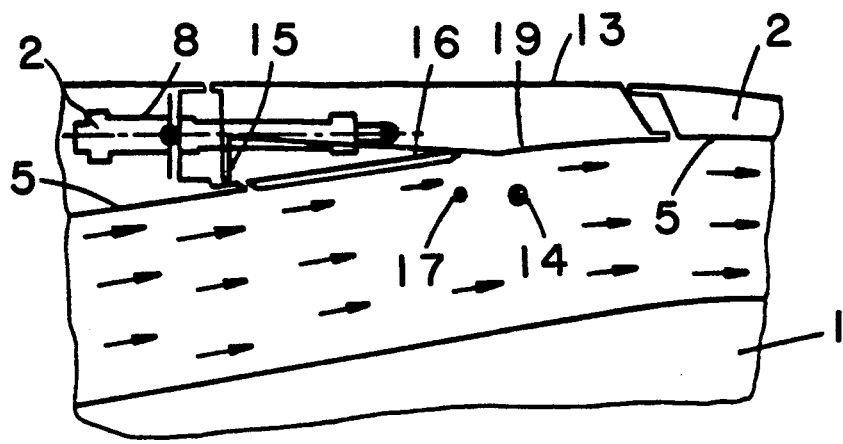
Figure 3:
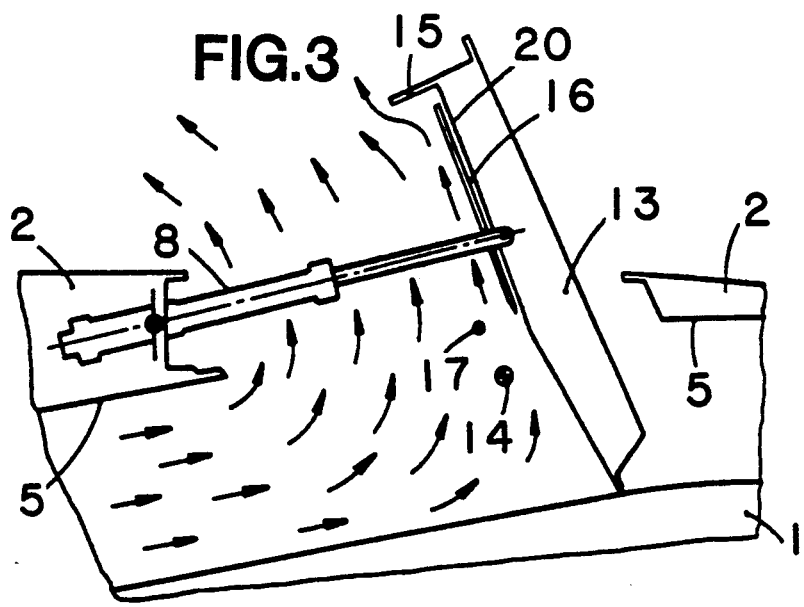
Figure 4:
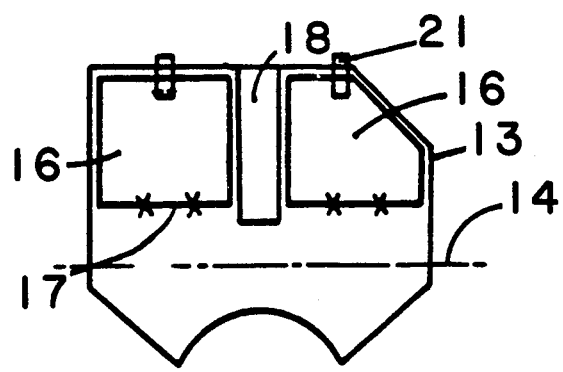
Figure 8:
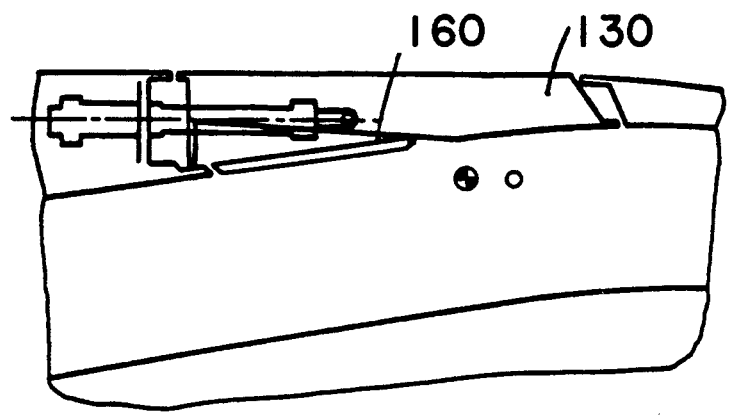
Figure 9:
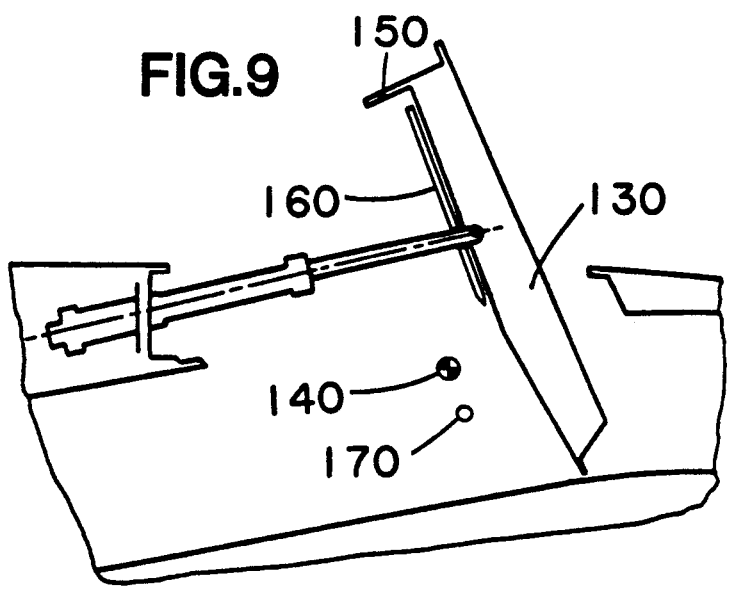
Figure 10:
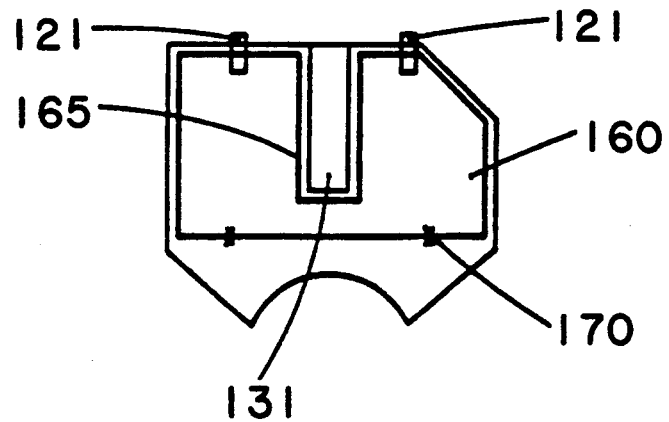

A preferred embodiment of the invention will now be described by way of non-limiting example with reference to the accompanying drawings in which:

FIG. 1 is a diagram illustrating a known reverser door not equipped with an auxiliary flap and in the closed position, FIGS. 2 and 3 show diagrammatically the kinematics of the door of a reverser with an auxiliary flap according to the invention, in the closed-door and the open-door position respectively, FIG. 4 shows a diagrammatic elevation view of a door according to the invention equipped with two flaps, FIG. 5 shows a door with a flap according to the invention, FIG. 6 shows a detailed view of the control of the flap, in the closed-door position, FIG. 7 shows the flap in the open-door position, FIGS. 8, 9 and 10 show an alternative embodiment in which the door is equipped with a single flap.

The following description and the drawings will deal solely with the suitability of the invention for a door-type reverser intended for equipping an engine of the double-flow type in which the deflection of the jet involves only the cold secondary flow circulating in an annular channel surrounding the structure of the engine discharging the hot flow.

However, it will be appreciated that the invention will apply in the same way to a reverser equipping a double-flow engine, the tilting doors of which would be located downstream of the ejection nozzle for the hot gases. Such an adaptation within the scope of an average technician is considered as belonging to the present invention.

As already mentioned, FIG. 1 shows a conventional reverser door not equipped with an auxiliary flap. In this Figure, the general appearance of which will be used to describe the invention, 1 denotes the axial part of the engine in which the hot primary flow circulates, and 2 denotes the external cowling of the engine which, with the part 1, forms an annular channel 3 for the circulation of the secondary cold flow coming, for example, from a turbine located in front of the engine and circulating according to the arrows 4. The outer wall of the annular channel is delimited by the inner surface 5 of the cowling 2. Tilting doors, one of which is shown at 6, are mounted in orifices of the cowling, their pivot axis being indicated diagrammatically at 7. Each door 6 is controlled by means of a jack 8 articulated on the stationary structure 2 at A and on the door at B. At the front, the door 6 has a front deflector 9 which, in the closed-door position, comes to bear against a projection C of the cowling. The upstream inner wall 10 of the door is setback in relation to the deflector. It will therefore be seen clearly that, because of this conventional configuration, when the door is closed this upstream part 10 is not aligned with the inner surface 5, along which the cold flow circulates and of which 11 designates diagrammatically the extension in line with the door. Between the beam 10 of the door and this line 11 there is therefore a space 12 which disrupts the flow of the fluid stream 4.

When, as in the invention, the door is equipped with one or more auxiliary flaps, the configuration of FIGS. 2 to 4 is obtained. In this embodiment, because the jack 8 is present in the mid-axis of the door 13, the latter possesses in its upstream part a recess 18, called a jack tunnel, making it possible to accommodate the jack in the closed-door position. There are therefore two auxiliary flaps 16 symmetrical relative to the tunnel 18 (FIG. 4), each of the flaps being articulated on the door about axes 17. It can be seen that in the closed-door position, without the front deflector 15 being modified, the flaps 16 coincide with the line 11 of FIG. 1, thereby reconstructing perfectly the regular geometry of the outer surface of the fluid stream (FIG. 2). The flaps are then in the extension of the rear part 19 of the door. In contrast, in the open-door position (FIG. 3), the flaps 16 are retracted against the upstream part 20 of the door, so as to expose the deflector 15 completely.

The mechanism for controlling the flaps will now be described by reference to FIGS. 5 and 6. At the upstream end of the flap 16 there is a piece 18 which, in the closed-door position, is intended to come to bear against a seal 190 equipping the projection 200 forming the edge of the deflection shaft, along which the fluid stream is deflected in the reverse mode. This piece 18 has a guide slot 124, into which is engaged slideably an axle 23 carried at the end of a bent lever 21 articulated about an axle 22 rotating in a bearing 123 fastened against the outer face of the deflector 15.

A helical spring 24 surrounding the axle 22 is attached to the bearing at one end at 26 and to the axle 22 at its other end at 25, in such a way that the said spring exerts on the lever 21 an elastic restoring torque in the direction of the arrow F.

The free end of the lever carries, for example, a roller 31 rotating idly about an axle 32, this roller being replaceable by a spherical component or by any other member allowing sliding contact against a stop 33 fastened to the structure 2 of the cowling by means of screws 251.

It will be seen that the stop 33 can advantageously be vertically adjustable by the interaction of grooved faces 241 provided on the sole of the stop and on its support.

When the door is in the open position, the lever is stressed by its spring into the position represented by broken lines in FIG. 5, and the axle 23, sliding in the slot 124, automatically folds the flap down against the door 13. For this purpose, a receptacle 20a for the piece 18 is provided in the inner wall 20 of the door. It will be seen that the slot has a substantially arcuate form, its convexity facing the door, with its parts 27 and 29 inclined and its part 28 and 30 straight. When the jack 8 returns the door to its closed position, towards the end of the movement the roller 31 makes contact with the stop 33, thus causing the lever to tilt counter to the action of the spring 24 and the flap to move away from the door. In the closed-door position, it will be seen that the action of the jack 8 on the door ensures, by means of the lever 21, that the flap 16 is blocked in a position bearing against the part 200.

Moreover, the flap is locked in its position of FIG. 6 as a result of the geometry of the lever 21 and of the slot 124. In fact, the surface S1-S'1 of the inclined front part 27 of the slot is such that, in the position of FIG. 6, it is substantially perpendicular to the line A1-A'1 joining the axles 22 and 23 of the lever. By means of this arrangement, a self-locking of the mechanism is obtained by the bearing of the axle 23 on the part 27, and all the forces, especially aerodynamic, which are exerted on the flap according to the arrow G (and which could tend to make it vibrate) are absorbed directly in the door, without interfering with the restoring torque of the spring 24 or generating too high a bearing force f of the roller 31 on the stop.

Likewise, in the open-door position, this lever/slot geometry ensures a stability of the flap, as shown in FIG. 7. In fact, in this position, a line A1-A'1 passing through the axles 22 and 23 of the lever is substantially perpendicular relative to the surface S2 S'2 of the inclined rear part 29 of the slot 124 on which the axle 23 bears. Thus, a static or vibrational force which, for example, is exerted on the flap according to the arrow M will be absorbed directly by the door as a result of the self-blocking and locking of the mechanism, without generating any restoring torque and without exerting any stress on the return spring of the lever.

In FIGS. 8 to 10, alternatively a single flap 160 for each door is used, this flap being articulated at 170 about axles located further downstream than in the preceding embodiment. The door 130 pivots about the axle 140, whilst the single flap 160 pivots about axles 170. The deflector 150 is identical to that of the preceding example. To allow the passage of the jack, the door has a tunnel 131 and the flap a rectangular cutout 165.

121 Indicates diagrammatically two control levers for the flap which are similar to the lever 21 of the preceding embodiment.

We claim:

1. A thrust reverser for a jet engine of the type including an external cowling defining a flow channel for the propulsion jet, comprising:
   (a) at least one tiltable door mounted on the cowling and movable between a closed position aligned with the cowling and a reversal position in which the door extends transversely to the flow channel for deflecting the propulsion jet, the door having a front deflector portion and an upstream door portion set back relative to the front deflector portion, said door being movable between an open position and a closed position, wherein in the closed position of the door the upstream door portion is offset with respect to the flow channel thus forming a vacuum zone;
   (b) at least one flap articulated at a downstream end about a shaft mounted on an internal wall of the door for covering the vacuum zone and for being positioned, when the door is in its closed position, in alignment with the flow channel, and when the door is in the open position, retracted against the upstream door portion;
   (c) alignment means for aligning the flap with a portion of the cowling defining the flow channel, said alignment means including a lever articulated to the door, one end of which lever cooperates with the flap and an opposing end of which lever cooperates with a stop carried by a fixed part of the cowling; and
   (d) resilient means for returning the flap to its retracted position against the door when the door is in the open reversal position.

2. A thrust reverser according to claim 1, wherein the flap includes an upstream end having a guide slot therein in which is seated an axle located at the end of the lever cooperating with the flap.

3. A thrust reverser according to claim 1, wherein the opposing end of the lever includes a member slidably contacting said stop.

4. A thrust reverser according to claim 1, wherein said resilient means comprises a helical spring.

5. A thrust reverser according to claim 1, wherein the stop is vertically adjustable.

6. A thrust reverser according to claim 1, wherein each door includes a single flap extending substantially the entire width of the door.

7. A thrust reverser according to claim 1, wherein each door includes first and second flaps articulated respectively on the door, both said first and second flaps including at least one control lever and resilient means for returning the flap to its retracted position against the door when the door is in the open reversal position.

8. A thrust reverser for a jet engine of the type including an external cowling defining a flow channel for the propulsion jet, comprising:
 (a) at least one tiltable door mounted on the cowling and movable between a closed position aligned with the cowling and a reversal position in which the door extends transversely to the flow channel for deflecting the propulsion jet, the door having a front deflector portion and an upstream door portion set back relative to the front deflector portion, said door being movable between an open position and a closed position, wherein in the closed position of the door the upstream door portion is offset with respect to the flow channel thus forming a vacuum zone;
 (b) at least one flap articulated at a downstream end about a shaft mounted on an internal wall of the door for covering the vacuum zone and for being positioned, when the door is in its closed position, in alignment with the flow channel, and when the door is in the open position, retracted against the upstream door portion, wherein the flap includes an upstream end having a guide slot therein in which is seated an axle located at the end of the lever articulated to the door, said guide slot having a substantially arcuate configuration, a convexity of said guide slot faces the door;
 (c) alignment means for aligning the flap with a portion of the cowling defining the flow channel, said alignment means including a lever articulated to the door, one end of which lever cooperates with the flap and an opposing end of which lever cooperates with a stop carried by a fixed part of the cowling, wherein the opposing end of the lever includes a member slidably contacting said stop; and
 (d) a spring for returning the flap to its retracted position against the door when the door is in the open reversal position.

9. A thrust reverser according to claim 8, wherein an upstream end of the guide slot has a bearing plane for the axle of the end of the lever, which bearing plane in the closed-door position is substantially perpendicular to a line defined between the axle of the end of the lever and the rotation axle of the lever.

10. A thrust reverser according to claim 8, wherein an downstream end of the guide slot has a bearing plane for the axle of the end of the lever, which bearing plane in the open-door position is substantially perpendicular to a line defined between the at the axle of the end of the lever and the rotation axle of the lever.

* * * * *